US011007447B2

(12) United States Patent
Carroll

(10) Patent No.: US 11,007,447 B2
(45) Date of Patent: *May 18, 2021

(54) TOY KIT FOR STORING FALLEN TOOTH OF CHILD

(71) Applicant: Elizabeth Carroll, Farmington, CT (US)

(72) Inventor: Elizabeth Carroll, Farmington, CT (US)

(73) Assignee: Elizabeth Carroll, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/718,049

(22) Filed: Sep. 28, 2017

(65) Prior Publication Data

US 2019/0091588 A1 Mar. 28, 2019

(51) Int. Cl.
*A63H 3/00* (2006.01)
*A61C 19/00* (2006.01)
*A63H 3/02* (2006.01)

(52) U.S. Cl.
CPC ........... *A63H 3/005* (2013.01); *A61C 19/008* (2013.01); *A63H 3/02* (2013.01)

(58) Field of Classification Search
CPC .......... A63H 3/02; A63H 3/003; A63H 3/005; A61C 19/008
USPC .................................. 446/72, 73, 74, 75, 76
See application file for complete search history.

(56) References Cited

U.S. PATENT DOCUMENTS

| | | | | |
|---|---|---|---|---|
| 2,080,439 A | * | 5/1937 | Schaeffer | A63H 3/24 446/305 |
| 2,096,601 A | * | 10/1937 | Weih | A63H 3/24 446/305 |
| 2,619,257 A | * | 11/1952 | Posner | A63H 3/24 222/215 |
| 2,631,408 A | * | 3/1953 | Henry | A63H 3/24 446/304 |
| 2,705,090 A | * | 3/1955 | Odermatt-Wehrli | A63H 3/24 222/207 |
| 5,046,986 A | * | 9/1991 | Wood | A63H 3/12 2/69 |
| 5,437,408 A | * | 8/1995 | Chesnut | A45C 1/12 194/344 |
| 5,713,781 A | * | 2/1998 | Castanis | A63H 3/005 446/369 |
| 5,799,423 A | * | 9/1998 | Malino | G09D 3/02 283/2 |
| 5,975,980 A | * | 11/1999 | Whiteneck | A63H 3/24 446/304 |
| 6,042,450 A | * | 3/2000 | Leversedge | A63H 3/365 446/304 |

(Continued)

*Primary Examiner* — Joseph B Baldori
(74) *Attorney, Agent, or Firm* — Emanus, LLC; Willie Jacques

(57) ABSTRACT

A toy kit for storing a fallen tooth of a child is disclosed. The toy kit includes a toy having a body defining a face and a chest portion. The face includes a mouth defining an opening for receiving the fallen tooth. The toy kit also includes a container located at the chest portion of the body to store the fallen tooth. The toy kit also includes a conduit disposed within the body. The conduit includes a first end connected to the mouth and a second end connected to the container. The conduit allows the fallen tooth received through the opening of the mouth to reach the container.

9 Claims, 6 Drawing Sheets

(56) References Cited

U.S. PATENT DOCUMENTS

| | | |
|---|---|---|
| 6,739,933 B2 * | 5/2004 | Taylor .................. A45F 5/00 220/703 |
| 8,651,915 B2 | 2/2014 | Irmler et al. |
| 2008/0090490 A1 | 4/2008 | Barrows et al. |
| 2008/0233829 A1 * | 9/2008 | Sayles .................. A45C 1/12 446/8 |
| 2010/0147229 A1 | 6/2010 | Defazio |
| 2015/0238880 A1 | 8/2015 | Austin |
| 2016/0030852 A1 | 2/2016 | Sandberg |
| 2017/0203219 A1 | 7/2017 | Dean |
| 2017/0225089 A1 | 8/2017 | Brant |

* cited by examiner

TOY KIT FOR STORING FALLEN TOOTH OF CHILD

FIELD OF THE DISCLOSURE

The invention relates to a toy kit, and particularly relates to a toy for storing a fallen tooth of a child and a method for introducing a tooth fairy story to the child using the toy.

BACKGROUND OF THE DISCLOSURE

Generally, a first set of teeth of children tend to fall during their age between 4 years to 8 years. Traditionally, a child tends to place the fallen tooth underneath the pillow because of the impression that he/she may lose the fallen tooth to a tooth fairy. The practice of placing the fallen tooth underneath the pillow is frightening and unhygienic practice. When each time the child loses a tooth, parents of the child try to act as the tooth fairy and try to retrieve the fallen tooth from the child. During the process of retrieving the fallen tooth when the child is asleep, the parents are reluctant to act since the act may wake up the child. Also, the child may hurt themselves while trying to protect the tooth during the retrieving process of the fallen tooth from the parents. Also, the child may fear as they may wake up to a stranger who they believe may take away the fallen tooth from them forever. Also, the child may worry about knocking the fallen tooth out from underneath the pillow. Retrieving and storing the fallen tooth of the child is a cumbersome process. Accordingly, there remains a need for more safer and secure method for retrieving and storing the fallen tooth of the child.

SUMMARY OF THE DISCLOSURE

In one aspect of the present disclosure, a toy kit for storing a fallen tooth of a child is provided. The toy kit includes a toy having a body defining a face and a chest portion. The face includes a mouth defining an opening configured to receive the fallen tooth. The toy kit further includes a container located at the chest portion of the body and configured to store the fallen tooth. The toy kit further includes a conduit disposed within the body. The conduit includes a first end connected to the mouth and a second end connected to the container. The conduit is configured to allow the fallen tooth received through the opening of the mouth to reach the container.

In another aspect of the present disclosure, a teddy bear for storing a fallen tooth of a child is provided. The teddy bear includes a stuffed body having an opening defined at a mouth of the teddy bear. The opening is configured to receive the fallen tooth. The teddy bear further includes a transparent container located at a chest portion of the stuffed body and configured to store the fallen tooth. The teddy bear further includes a conduit disposed within the stuffed body. The conduit includes a first end connected to the mouth and a second end connected to the transparent container. The conduit is configured to allow the fallen tooth received through the opening of the mouth to reach the transparent container.

In yet another aspect of the present disclosure, a method for introducing a tooth fairy story to a child using a toy is provided. The method includes receiving a fallen tooth of the child into the toy via an opening defined at a mouth of the toy. The method further includes storing the fallen tooth in a transparent container located at a chest portion of the toy. The method further includes placing the toy at a first location near the child, and placing a gift in a pocket defined in a cape. The cape is disposed around a neck portion of the toy.

Other features and aspects of this disclosure will be apparent from the following description and the accompanying drawings.

BRIEF DESCRIPTION OF THE DRAWINGS

While the specification concludes with claims particularly pointing out and distinctly claiming particular embodiments of the present disclosure, various embodiments of the present disclosure can be more readily understood and appreciated from the following descriptions of various embodiments of the present disclosure when read in conjunction with the accompanying drawings, in which:

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
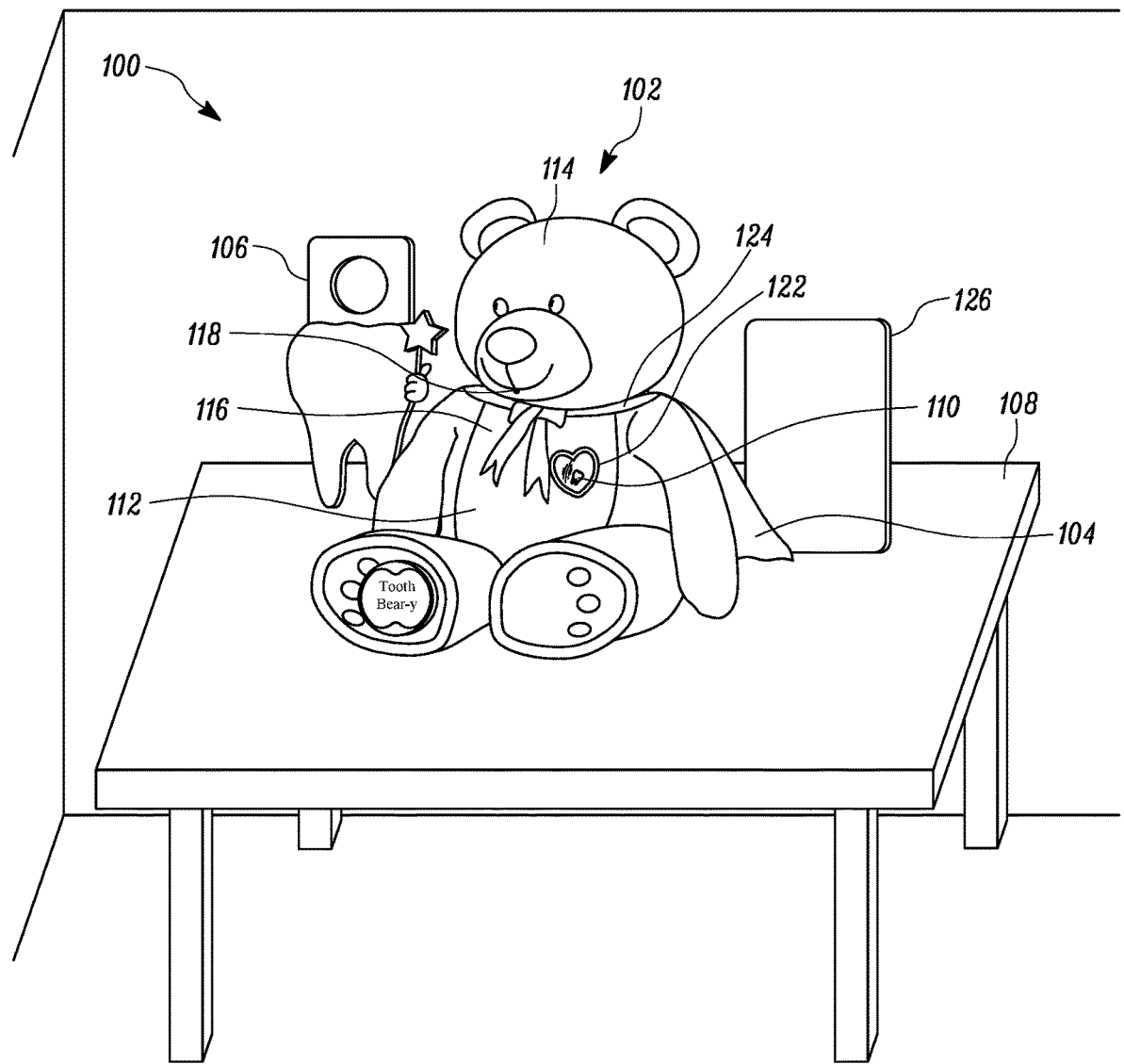
FIG. 1 is a perspective view of a toy kit, including a toy, a cape, and a holder, used for storing a fallen tooth of a child, according to an embodiment of the present disclosure.

FIG. 1 illustrates a toy kit 100 including a toy 102, a cape 104, and a holder 106, according to an embodiment of the present disclosure. The toy kit 100 may be placed on a platform 108, such as a table, as shown in FIG. 1, for illustration purpose of the present disclosure. The toy kit 100 is used for storing a fallen tooth 110 of a child and for introducing a tooth fairy story to the child. In an example, the fallen tooth 110 may be a milk tooth of the child. In an example, a first set of teeth of the child may fall at an age between 4 years to 8 years. The child tends to place the fallen tooth 110 underneath the pillow because of the impression that a tooth fairy may visit while the child is asleep and place a gift. The toy kit 100 includes the toy 102 for storing the fallen tooth 110 of the child. The fallen tooth 110 is hereinafter referred to as 'the tooth 110'. In the illustrated embodiment, the toy 102 is a teddy bear. Particularly, the toy 102 is a stuffed soft teddy bear. Although, the toy 102 is depicted as the teddy bear, it may be understood that the toy 102 may alternatively be a soft toy, such as a Barbie doll, a baby doll, a squishy toy, or a toy animal that the child may be interested to store the tooth 110. The toy 102 is hereinafter referred to as 'the teddy bear 102'.

Figure 2:
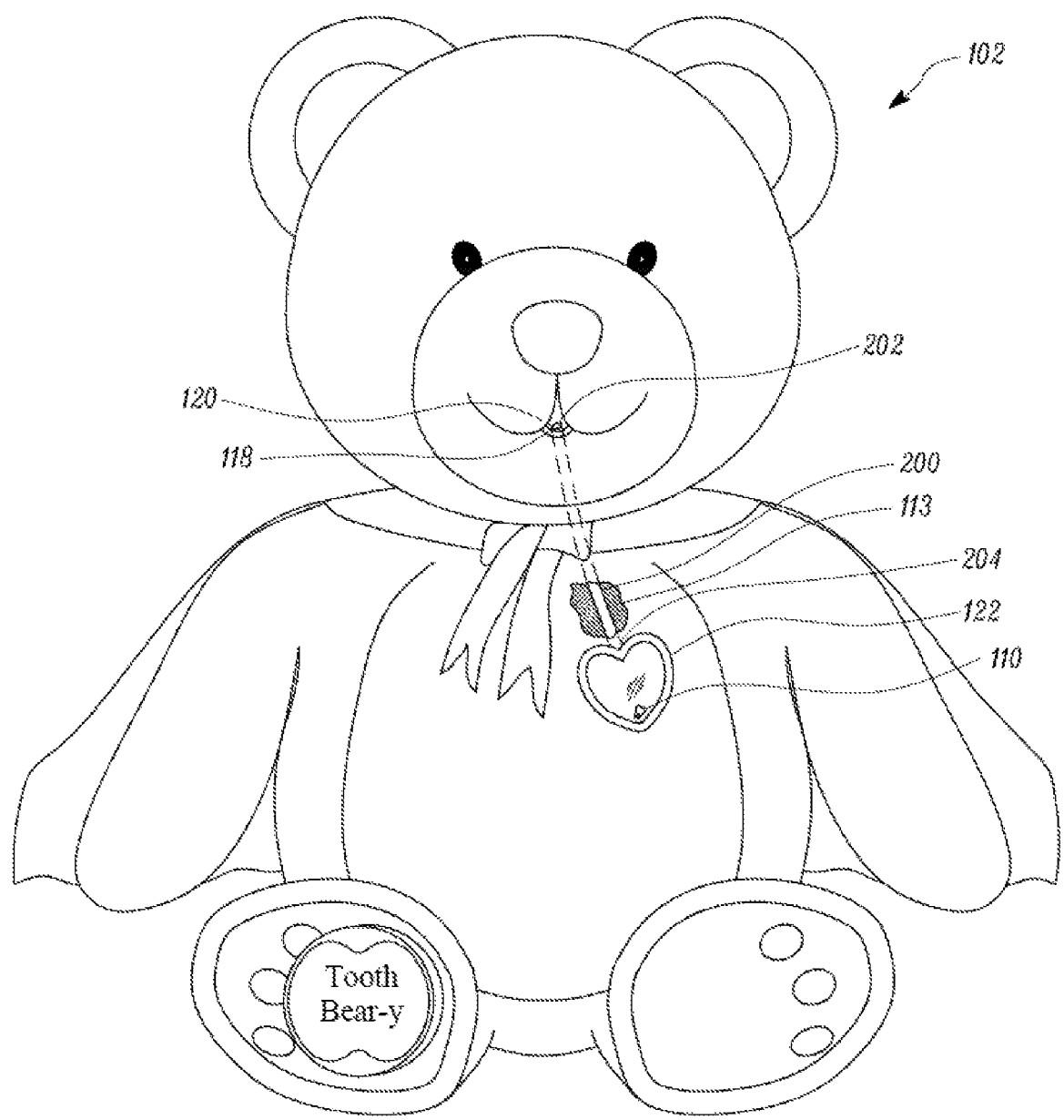
FIG. 2 is a front view of the toy having a conduit connected between a mouth of the toy and a container located at a chest portion of the toy, according to an embodiment of the present disclosure.

The teddy bear 102 may be formed from a number of pieces of fabric that may be sewn together to form a body 112. The body 112 may further define a cavity (not shown) for stuffing a filling material 113 (shown in FIG. 2) therein. In an example, the filling material 113 may include, but not limited to, cotton, fiber, woodwool, polyester, sponge, plastic pellets, and wool. The body 112 is hereinafter referred to as "the stuffed body 112". The stuffed body 112 of the teddy bear 102 includes a face 114 and a chest portion 116. The face 114 includes a mouth 118 defining an opening 120 (as shown in FIG. 2). In one embodiment, multiple parts of the teddy bear 102, such as head having the face 114, torso having the chest portion 116, arms, and legs may be stitched separately and then the multiple parts may be combined for stuffing. In some embodiments, the multiple parts of the teddy bear 102 may be stitched as a single unit and then stuffed with the filling material 113.

The toy kit 100 further includes a container 122 located at the chest portion 116 of the stuffed body 112. The container 122 is configured to store the tooth 110 of the child. In the illustrated embodiment, the container 122 represents a heart of the teddy bear 102. Although, in the illustrated embodiment, the container 122 is used for storing the tooth 110 of the child, it may be understood that any article that the child may be interested, can be stored in the container 122. It may also be understood that a size of the article and a number of the articles may vary based on a volume of a hollow space of the container 122.

The toy kit 100 further includes the holder 106 for displaying a storyline about the tooth 110 of the child. The toy kit 100 further includes the cape 104 disposed around a neck portion 124 of the stuffed body 112 of the teddy bear 102, and a sticker set 126 for labelling the cape 104 of the teddy bear 102. The sticker set 126 may include stickers of alphabets, numerals, and special characters for labelling the cape 104 as desired by the child. In an example, the child may label the cape 104 with a name of the child or with a name of loved ones of the child using the sticker set 126. Further, the teddy bear 102 may include a tag to indicate a name of the teddy bear 102. As shown, the tag is placed on a leg of the teddy bear 102. In an example, the tag includes a name "Tooth Bear-y" that indicates the name of the teddy bear 102.

FIG. 2 illustrates the teddy bear 102 having a conduit 200 connected between the mouth 118 and the container 122, according to an embodiment of the present disclosure. The opening 120 defined at the mouth 118 is configured to receive the tooth 110 from the child. In the illustrated embodiment, the opening 120 is in circular shape. In certain embodiments, the opening 120 may be one of a semicircle shape, an oval shape, a polygon shape, or any other shape that will allow receipt of the tooth 110 therethrough. In an example, a diameter of the opening 120 may range from 0.5 centimeter (cm) to 3.0 cm.

The conduit 200 is disposed within the stuffed body 112 of the teddy bear 102. More specifically, the conduit 200 is located within the cavity of the stuffed body 112 and surrounded by the filling material 113. The conduit 200 includes a first end 202 connected to the mouth 118 of the teddy bear 102 and a second end 204 connected to the container 122. The conduit 200 may be connected to the mouth 118 in such a way that the first end 202 of the conduit 200 communicates with the opening 120 defined by the mouth 118. The conduit 200 is configured to allow the tooth 110 received through the opening 120 of the mouth 118 to reach the container 122. Further, the first end 202 and the second end 204 of the conduit 200 are removably coupled to the mouth 118 and the container 122, respectively. In the illustrated embodiment, the conduit 200 may be made from a plastic material and has a circular cross section. However, it may be understood that the conduit 200 may be made from materials including, but not limited to, a polymer, and a rubber. In some embodiments, a diameter of the first end 202 of the conduit 200 may be equal to a diameter of the opening 120 defined at the mouth 118 of the teddy bear 102. As such, the first end 202 of the conduit 200 may define the opening 120 at the mouth 118 to receive the tooth 110 of the child.

In an alternate embodiment, a diaphragm member (not shown) may be disposed at the mouth 118 to define the opening 120. The diaphragm member may selectively allow receipt of the tooth 110 into the conduit 200 through the mouth 118. The diaphragm member may be configured to operate between an open position and a closed position. In the open position of the diaphragm member, the tooth 110 may be received through the mouth 118 and may reach the container 122. In the closed position of the diaphragm member, entry of dust or insects into the container 122 may be prevented. The diaphragm member may be moved to the open position by pressing the mouth 118 from both cheeks of the teddy bear 102. In some embodiments, a push button arrangement or a shutter arrangement may be disposed at the mouth 118 to selectively allow entry of the tooth 110 into the conduit 200 through the mouth 118.

Figure 3A:
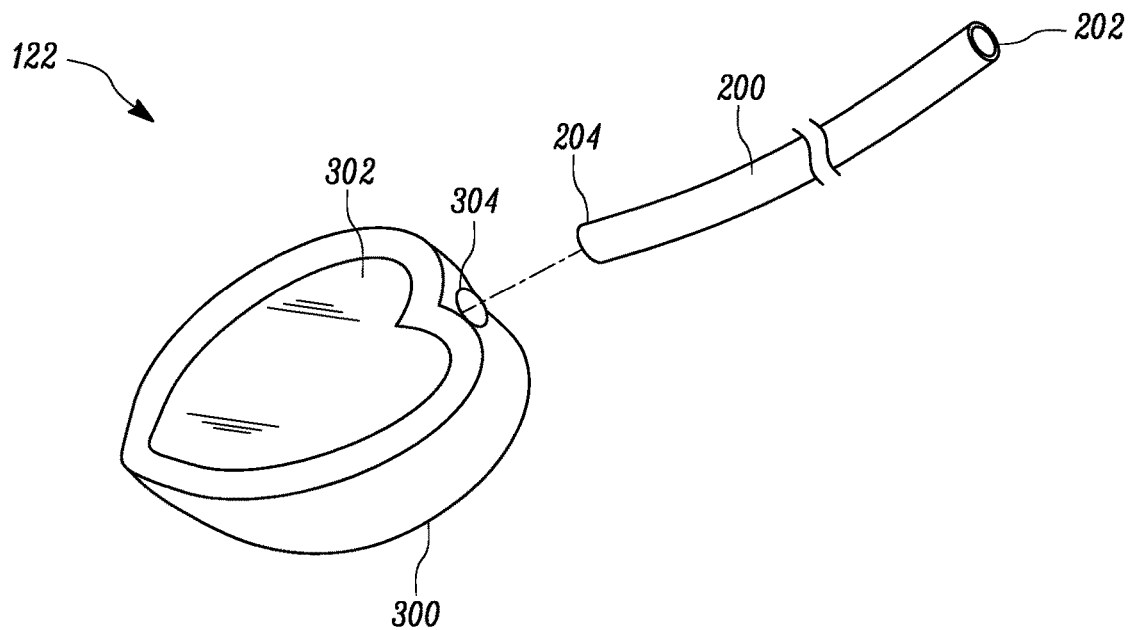
FIG. 3A is an exploded view of the container and the conduit connected to the container, according to an embodiment of the present disclosure.

FIG. 3A illustrates an exploded view of the container 122 and the conduit 200 connected to the container 122, according to an embodiment of the present disclosure. As described above, the container 122 is located at the chest portion 116 of the stuffed body 112. The container 122 includes a base portion 300 and a transparent wall 302 attached to the base portion 300. Thus, the container 122 is configured to allow visibility of the tooth 110 stored therein. In the illustrated embodiment, the base portion 300 is formed in a shape of a heart symbol. In some embodiments, a shape of the container 122 may be, but not limited to, a diamond shape, an oval shape, and a circular shape, for storing the tooth 110 received through the opening 120 of the mouth 118. In an embodiment, the chest portion 116 may include a hole (not shown) to receive the container 122, thereby allowing visibility of the tooth 110 from outside the teddy bear 102. In an example, the base portion 300 of the container 122 may be attached to the chest portion 116 of the teddy bear 102 using an adhesive or a press fit mechanism.

The base portion 300 includes a hole 304 at a top end thereof to receive the second end 204 of the conduit 200. During manufacturing of the container 122, the second end 204 of the conduit 200 may be received through the hole 304 of the base portion 300 of the container 122. Further, the second end 204 of the conduit 200 may be aligned with the hole 304. Further, the second end 204 of the conduit 200 may be attached to the container 122, for example, using an adhesive or a press fit mechanism. In an alternate embodiment, the second end 204 of the conduit 200 may be received through the hole 304 and projected within the container 122. In one embodiment, the base portion 300 and the transparent wall 302 may be manufactured as a single component with the hole 304 at the top end of the base portion 300. The transparent wall 302 may be made up of materials including, but not limited to, plastic, glass, fiber or any other material that may render transparency to the transparent wall 302. In an alternate embodiment, the base portion 300 and the transparent wall 302 may be manufactured individually and then attached together to form the container 122. The container 122 is alternatively referred to as 'the transparent container 122'.

Figure 3B:
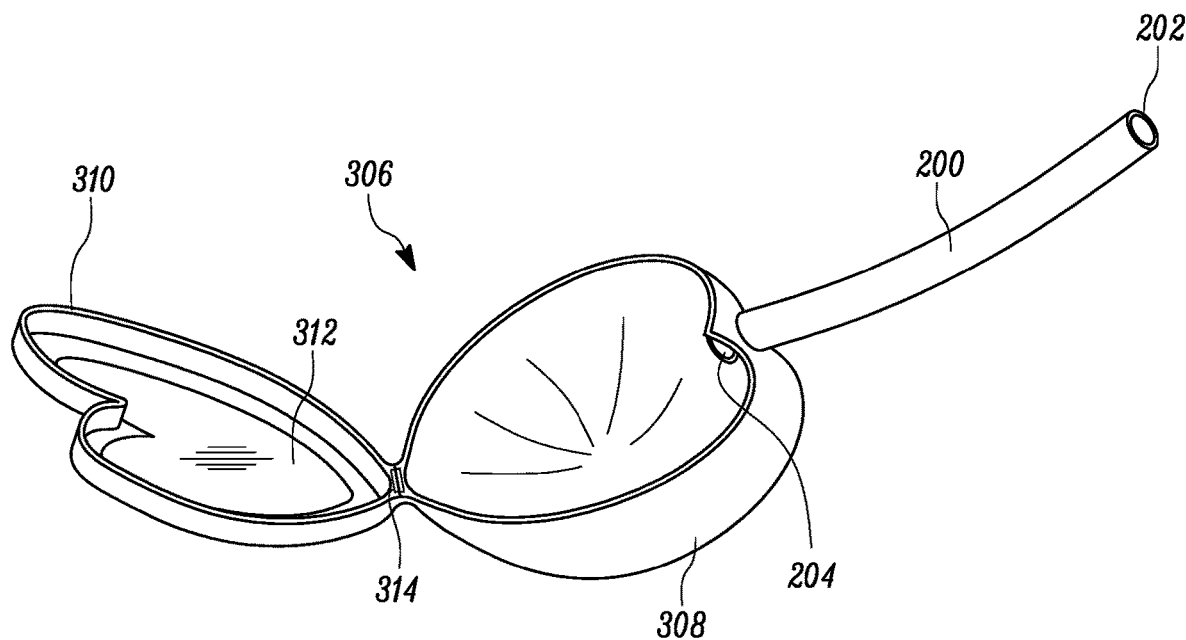
FIG. 3B is a perspective view of a container and the conduit connected to the container, according to another embodiment of the present disclosure.

FIG. 3B illustrates a container 306 and the conduit 200 connected to the container 306, according to another embodiment of the present disclosure. The container 306 may include a base portion 308, and a lid 310 having a transparent wall 312 attached to the base portion 308. A top end of the base portion 308 may be connected with the second end 204 of the conduit 200. A bottom end of the lid 310 and a bottom end of the base portion 308 may be coupled via a hinge member 314. The hinge member 314 may allow pivotal movement of the lid 310 relative to the base portion 308. When the lid 310 is detached from the base portion 308, the container 306 provides access to the tooth 110 stored therein. More specifically, the lid 310 may be detached (as shown) from the base portion 308 of the container 306 to provide access from outside the teddy bear 102 to collect the tooth 110 stored within the container 306. Upon collecting the tooth 110 from the container 306, the collected tooth can be stored in any other location as desired by the child or the loved ones of the child.

Figure 4:
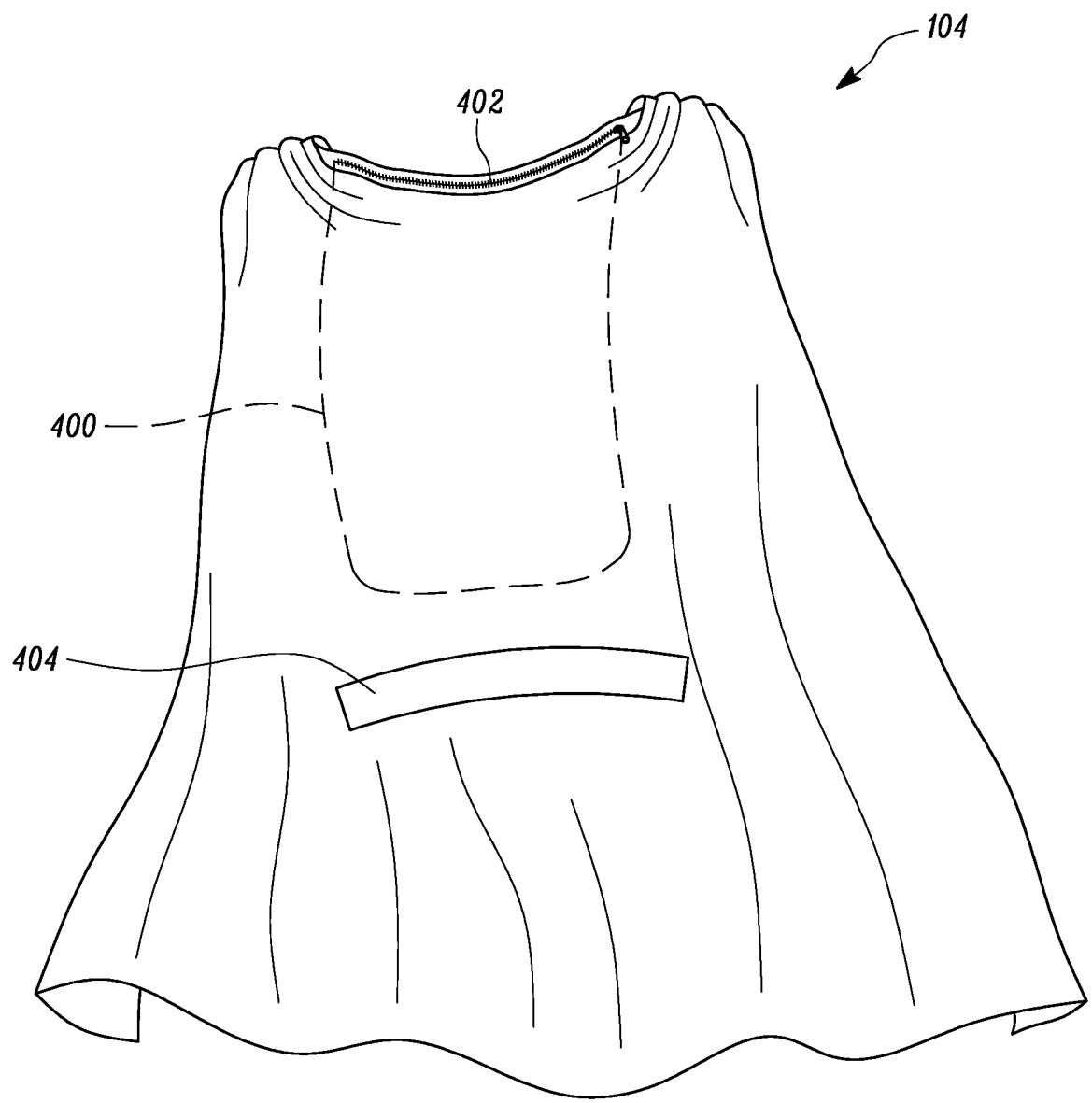
FIG. 4 is a perspective view of the cape disposed around a neck portion of the toy, according to an embodiment of the present disclosure.

FIG. 4 illustrates the cape 104 disposed around the neck portion 124 of the teddy bear 102, according to an embodiment of the present disclosure. As described above, the toy kit 100 includes the cape 104 tied around the neck portion 124 of the stuffed body 112 of the teddy bear 102. In an alternate embodiment, the cape 104 may be stitched to the neck portion 124 of the stuffed body 112 of the teddy bear 102.

The cape 104 may be a garment that drapes a back portion of the teddy bear 102. The cape 104 includes a pocket 400 configured to store a gift (not shown). The pocket 400 may be a compartment defined in the cape 104 with a zip lock 402. The pocket 400 may be defined along a height of the cape 104. In some embodiments, the back portion of the stuffed body 112 of the teddy bear 102 may be provided with the pocket 400 with the zip lock 402 to store the gift. It may also be understood that the pocket 400 may be located anywhere in the stuffed body 112 to store the gift.

As described above, the sticker set 126 is used for labelling the cape 104 of the teddy bear 102. In one embodiment, the cape 104 may include a banner 404 attached thereto. In an example, the banner 404 may be attached to the cape 104 using a Velcro arrangement. In particular, the sticker set 126 is used for labelling the banner 404 of the cape 104 with the name of the child. The pocket 400 may also be configured to store the sticker set 126. In some embodiments, the cape 104 may be labelled with the name of the child at any location as desired by the child.

Figure 5:
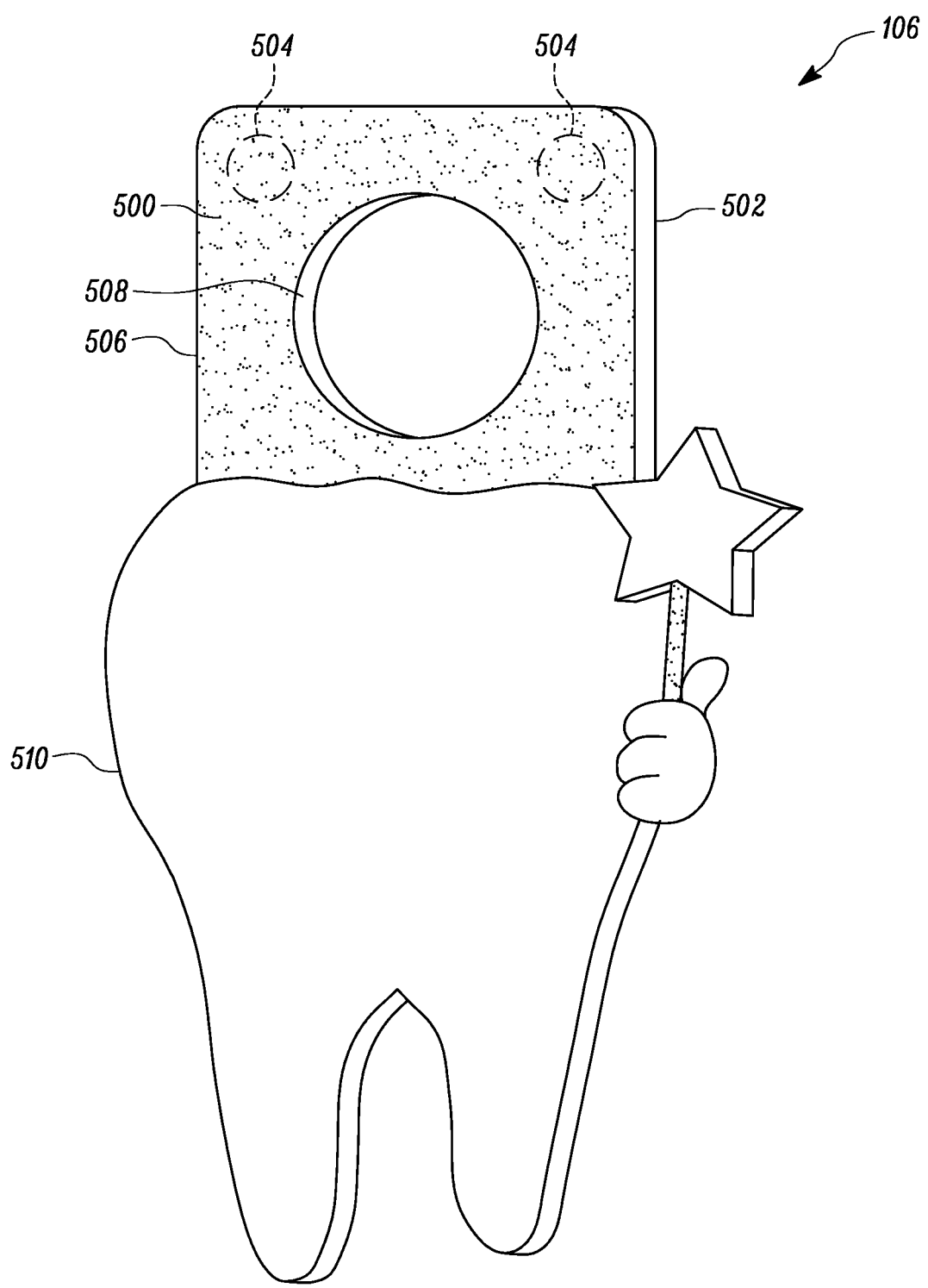
FIG. 5 is a perspective view of the holder displaying a storyline about the fallen tooth of the child, according to an embodiment of the present disclosure.

FIG. 5 illustrates the holder 106 for displaying the storyline about the tooth 110 of the child, according to an embodiment of the present disclosure. The holder 106 is configured to be attached to a door, a metal surface or a wall. More specifically, the holder 106 includes an outer surface 500 configured to display the storyline and an inner surface 502 having one or more magnetic members 504. The one or more magnetic members 504 are configured to attach the holder 106 with the metal surface. The holder 106 includes a top portion 506 having a cutout 508 and a bottom portion 510 for displaying the storyline. The cutout 508 is configured to be engaged with a knob of a door. The cutout 508 in the top portion 506 of the holder 106 may also be used for hanging the holder 106 onto the wall or the metal surface. As shown in FIG. 5, the bottom portion 510 is in a shape of a tooth. Although, the toy kit 100 includes the holder 106 for attaching to the door, the metal surface, or the wall, it may be understood that the holder 106 may be attached to the stuffed body 112 of the teddy bear 102 for displaying the storyline. In an example, the holder 106 may be attached to an arm of the teddy bear 102.

INDUSTRIAL APPLICABILITY

The present disclosure relates to the toy kit 100 used for storing the tooth 110 of the child. The tooth 110 of the child is stored in the transparent container 122. The transparent container 122 may be sprinkled with organic sanitizer or disinfectant solution to maintain hygiene of the tooth 110 stored in the transparent container 122. The opening 120 defined at the mouth 118 receives the tooth 110 of the child. The conduit 200 allows movement of the tooth 110 into the transparent container 122 as the first end 202 of the conduit 200 is connected to the mouth 118 and the second end 204 is connected to the transparent container 122. The cape 104, the holder 106, and the sticker set 126 are provided as accessories along with the teddy bear 102. According to the present disclosure, although the toy kit 100 includes the cape 104, the holder 106, and the sticker set 126, it may be understood that the cape 104, the holder 106, and the sticker set 126 may be purchased separately. The child's fear of losing the tooth 110 to a tooth fairy is eradicated as the tooth 110 of the child is stored in the transparent container 122 of the teddy bear 102. In an example, parents or loved ones of the child may act as the tooth fairy. The toy kit 100 of the present disclosure is a stress-free, fun, and a useful kit that benefits the parents and the child. The toy kit 100 also explains the child the importance of caring and sharing. Also, the teddy bear 102 of the toy kit 100 is a lovable and huggable toy that provides a meaningful way to approach the procedure of storing and donating the tooth 110 of the child.

According to an aspect of the present disclosure, the toy kit 100 is used for replacing frightening experience of the child who place the first set of teeth under the pillows and await an entry of the tooth fairy at night. In an example, it is believed that the tooth fairy may take the teeth away, which may cause a fear in the child that he/she may lose the teeth forever. With the toy kit 100 of the present disclosure, the child, upon losing the tooth 110, places the tooth 100 in the mouth 118 of the teddy bear 102. The tooth 110 travels through the conduit 200 and stored in the transparent container 122.

Figure 6:
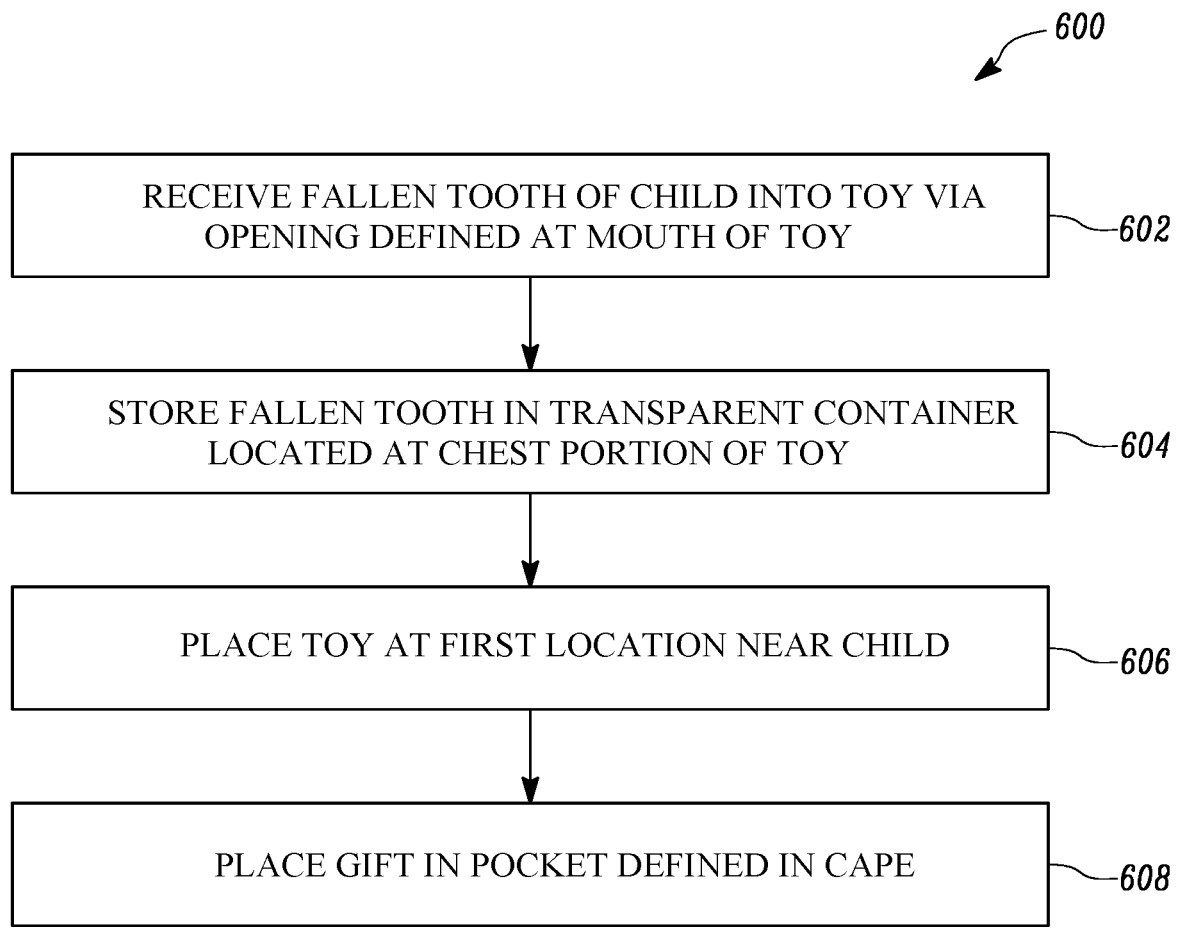
FIG. 6 is a flow chart of a method for introducing a tooth fairy story to the child using the toy, according to an embodiment of the present disclosure.

FIG. 6 illustrates a flow chart of a method 600 for introducing the tooth fairy story to the child using the teddy bear 102. The sequence in which the method 600 is described is not intended as a limitation, and any number of the described method steps may be combined in any order to implement the method, or an alternative method. Additionally, individual blocks may be deleted from the method without departing from the spirit and scope of the present disclosure.

At step 602, the method 600 includes receiving the tooth 110 of the child into the teddy bear 102 via the opening 120 defined at the mouth 118 of the teddy bear 102. When the child loses the tooth 110, the child may donate the tooth 110 to the teddy bear 102 as the teddy bear 102 is being considered as a good friend of the child. Further, as the child is under the impression that the teddy bear 102 has no teeth, as a courtesy and being a kind hearted person, the child may donate the tooth 110 to the teddy bear 102. As such, the child is encouraged to deposit the tooth 110 into the opening 120 defined at the mouth 118 of the teddy bear 102.

At step 604, the method 600 includes storing the tooth 110 in the transparent container 122 located at the chest portion 116 of the teddy bear 102. Once the tooth 110 of the child is received in the opening 120, the tooth 110 is moved through the conduit 200 and stored in the transparent container 122. In an example, the transparent container 122 may store a first of teeth that the child loses. The conduit 200 includes the first end 202 connected to the mouth 118 and the second end 204 connected to the transparent container 122. Thus, the conduit 200 enables movement of the tooth 110 from the opening 120 defined at the mouth 118 to the transparent container 122.

At step 606, the method 600 includes placing the toy 102 at a first location near the child. Upon receiving and storing the tooth 110 in the transparent container 122, the child places the toy 102 at the first location as desired by the child, before the child goes to bed on night. In an example, the first location may be on a table next to the child. In another example, the first location may be on the bed of the child. In yet another example, the first location may be anywhere within a living room or a bed room of the child.

At step 608, the method 600 includes placing the gift in the pocket 400 defined in the cape 104. The cape 104 is disposed around the neck portion 124 of the teddy bear 102. In an example, the gift placed in the pocket 400 may include, but not limited to, a soft toy, a toffy, money, or any gift that may be of interest to the child. The method 600 also includes labelling the name of the child to the banner 404 attached to the cape 104. The banner 404 of the cape 104 is labelled using the sticker set 126. In particular, the sticker set 126 is used for labelling the banner 404 of the cape 104 with the name of the child or with the name of the loved ones of the child.

The method 600 also includes placing the holder 106, having the storyline about the tooth 110 of the child, at a second location desired by the child. In one example, the second location may be on the knob of the door of a bedroom of the child. In another example, the second location may be a refrigerator handle. In an example, the storyline displayed on the holder 106 may read as follows:

Hi Tooth Fairy, I am Tooth Bear-y!
I have a special request of you!
My thoughtful, good friend has lost a tooth
And I'm asking of you something new to do!
The tooth was placed inside my heart
Where it will be kept-safe to stay.
It fills my heart with love and joy,
It's treasured each and every day!
Thank you Tooth Fairy for the gift you share!
In the cape on my back, please place it there
So my friend will be happy and know you care
That these teeth have been given to this grateful bear!

Upon displaying the storyline on the holder 106, the child may be under an impression that the tooth fairy may donate the gift into the pocket 400 of the cape 104 on noticing the child's act of donating the tooth 110 to the teddy bear 102.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

LIST OF ELEMENTS

100 Toy kit
102 Toy/Teddy Bear
104 Cape
106 Holder
108 Platform
110 Fallen tooth
112 Body/Stuffed body
113 Filling material
114 Face
116 Chest portion
118 Mouth
120 Opening
122 Container/Transparent Container
124 Neck portion
126 Sticker set
200 Conduit
202 First end
204 Second end
300 Base portion
302 Transparent wall
304 Hole
306 Container
308 Base portion
310 Lid
312 Transparent wall
314 Hinge member
400 Pocket
402 Zip lock
404 Banner
500 Outer surface
502 Inner surface
504 One or more magnetic members
506 Top portion
508 Cutout
510 Bottom portion
600 Method
602 Step
604 Step
606 Step
608 Step

What is claimed is:

1. A toy kit for storing and retrieving a fallen tooth of a child, the toy kit comprising:
a toy having a stuffed body defining a face and a chest portion, wherein the face comprises a mouth defining an opening configured to receive the fallen tooth and the chest portion comprises a hole to receive a container that allows visibility of the fallen tooth from outside the toy;
the container, including a base portion and a lid, located at the chest portion of the stuffed body, configured to store the fallen tooth and provide access to the fallen tooth, wherein the base portion of the container is attached to the chest portion of the toy,
wherein a bottom end of the base portion and a bottom end of the lid are coupled via a hinge member to allow pivotal movement of the lid, the lid is detached from the base portion to provide access from outside the toy to retrieve the fallen tooth stored within the container; and a conduit disposed within a cavity of the stuffed body, the conduit having a first end removably coupled to the mouth and a second end removably coupled to a top end of the base portion of the container, wherein the second end of the conduit is received through a hole of the base portion of the container, wherein the conduit is configured to allow the fallen tooth received through the opening of the mouth to reach the container.

2. The toy kit of claim 1, wherein the toy is a teddy bear, a baby doll, or a soft toy.

3. The toy kit of claim 1, wherein the container is removably attached to the chest portion of the body.

4. The toy kit of claim 1, wherein the container and the chest portion are configured to allow visibility of the fallen tooth stored therein.

5. The toy kit of claim 1 further comprising, a cape having a pocket, around a neck portion of the body of the toy, the pocket configured to store a gift.

6. The toy kit of claim 5 further comprising, a sticker set for labelling a banner attached to the cape.

7. A teddy bear for storing a fallen tooth of a child, the teddy bear comprising:
   a stuffed body having an opening defined at a mouth of the teddy bear, wherein the opening is configured to receive the fallen tooth and a chest portion of the stuffed body comprises a hole to receive a transparent container that allows visibility of the fallen tooth from outside the toy;
   the transparent container, including a base portion and a lid, located at the chest portion of the stuffed body configured to store the fallen tooth, wherein the base portion of the container is attached to the chest portion of the toy,
   wherein a bottom end of the base portion and a bottom end of the lid are coupled via a hinge member to allow pivotal movement of the lid, the lid is detached from the base portion to provide access from outside the teddy bear to retrieve the fallen tooth stored within the container; and
   a conduit disposed within a cavity of the stuffed body, the conduit having a first end removably coupled to the mouth and a second end removably coupled to a top end of the base portion of the transparent container, wherein the second end of the conduit is received through a hole of the base portion of the container,
   wherein the conduit is configured to allow the fallen tooth received through the opening of the mouth to reach the transparent container.

8. The teddy bear of claim 7, wherein the transparent container is removably attached to the chest portion of the stuffed body.

9. A toy kit for storing and retrieving an article, the toy kit comprising:
   a toy having a stuffed body defining a face and a chest portion wherein the face comprises a mouth defining an opening configured to receive the article and the chest portion comprises a hole to receive a container that allows visibility of the article from outside the toy;
   the container, including a base portion and a lid, located at the chest portion of the stuffed body, configured to store the article, wherein the base portion of the container is attached to the chest portion of the toy,
   wherein a bottom end of the base portion and a bottom end of the lid are coupled via a hinge member to allow pivotal movement of the lid, the lid is detached from the base portion to provide access from outside the toy to retrieve the article stored within the container; and
   a conduit disposed within a cavity of the stuffed body, the conduit having a first end removably coupled to the mouth and a second end removably coupled to a top end of the base portion of the container, wherein the second end of the conduit is received through a hole of the base portion of the container,
   wherein the conduit is configured to allow the article received through the opening of the mouth to reach the container.

* * * * *